United States Patent
Kusaka et al.

(10) Patent No.: US 9,247,221 B2
(45) Date of Patent: Jan. 26, 2016

(54) SCANNING TYPE PROJECTOR

(71) Applicant: Hitachi Media Electronics Co., Ltd., Yokohama-shi, Kanagawa (JP)

(72) Inventors: Hiromi Kusaka, Yokohama (JP); Yoshiho Seo, Yokohama (JP); Satoshi Ouchi, Yokohama (JP); Michio Hatagi, Chigasaki (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 197 days.

(21) Appl. No.: 13/958,827

(22) Filed: Aug. 5, 2013

(65) Prior Publication Data

US 2014/0078473 A1    Mar. 20, 2014

(30) Foreign Application Priority Data

Sep. 14, 2012    (JP) .................................. 2012-202215

(51) Int. Cl.
  *G03B 21/20*    (2006.01)
  *H04N 9/31*    (2006.01)
  *G02B 27/09*    (2006.01)
  *G02B 5/04*    (2006.01)
  *G02B 26/10*    (2006.01)

(52) U.S. Cl.
  CPC ................ *H04N 9/3129* (2013.01); *G02B 5/04* (2013.01); *G02B 26/101* (2013.01); *G02B 26/105* (2013.01); *G02B 27/09* (2013.01); *G02B 27/0966* (2013.01); *G02B 27/0972* (2013.01); *G03B 21/208* (2013.01); *G03B 21/2033* (2013.01)

(58) Field of Classification Search
  CPC .. G03B 21/2033; G03B 21/208; G02B 27/20; G02B 5/04; G02B 5/045; F21W 2131/406; H04N 9/3129; H04N 9/3161
  USPC ................................... 353/102; 362/259, 339
  See application file for complete search history.

(56) References Cited

U.S. PATENT DOCUMENTS

| 7,355,798 | B2* | 4/2008 | Sun ................................ 359/641 |
| 2003/0011751 | A1* | 1/2003 | Sakata et al. ..................... 353/30 |
| 2011/0249312 | A1* | 10/2011 | Ishida et al. ................ 359/202.1 |
| 2012/0293775 | A1* | 11/2012 | Kita ...................... G02B 26/105  353/38 |

FOREIGN PATENT DOCUMENTS

JP    2010-032797 A    2/2010

* cited by examiner

Primary Examiner — William C Dowling
Assistant Examiner — Ryan Howard
(74) Attorney, Agent, or Firm — Volpe and Koenig, P.C.

(57) ABSTRACT

A scanning type projector two-dimensionally projecting a laser beam and generating an image according to the present invention comprises: a light source having a light intensity corresponding to a pixel of the image and emitting a laser beam having an elliptical beam; a collimator lens collimating a laser beam emitted from the light source without converting the same into focused light; a beam contracting/shaping element that reduces a luminous beam width in a predetermined direction of the laser beam emitted from the collimator lens; a condensing lens that converts a laser beam emitted from the beam contracting/shaping element into focused light corresponding to a projection distance; and a two-dimensional scanning unit configured to two-dimensionally scan and project a laser beam emitted from the condensing lens.

11 Claims, 6 Drawing Sheets

SCANNING TYPE PROJECTOR

INCORPORATION BY REFERENCE

The present application claims priority from Japanese application JP-2012-202215 filed on Sep. 14, 2012, the content of which is hereby incorporated by reference into this application.

BACKGROUND OF THE INVENTION

The present invention is directed to scanning type projectors two-dimensionally scanning a laser beam and displaying an image, and relates to the configuration of optical elements that output a laser beam for providing a high resolution image.

In recent years, due to an increase in the output power and a reduction in the price of a visible light semiconductor laser, a scanning type projector has been realized, which two-dimensionally scans a laser beam emitted from a semiconductor laser onto a plane to be projected and displays an image. Because this scanning type projector directly modulates the light intensity of a laser beam and displays an image, it has an advantage in that the contrast ratio is extremely high as compared with the projectors using a conventional liquid crystal panel or the like. Furthermore, different from a liquid crystal panel and/or a projector using a digital mirror device (DMD) as an image modulation element, the scanning type projector directly modulates the light intensity of a laser beam and displays an image, so it has a high energy efficiency of projected light and thus is expected as the next-generation display device.

For example, JP-A-2010-32797 discloses one example of the technique for a light-scanning type projector. Specifically, JP-A-2010-32797 discloses a light-scanning type projector comprising; a light source unit emitting each of R, G, and B light beams; two wedge prisms substantially equalizing the luminous beam diameters of the light beams emitted from the light sources; a color synthesis unit coaxially synthesizing light beams from a plurality of light sources; a beam scanning unit two-dimensionally deflecting synthetic light; and a free curved face prism enlarging the deflection angle of the deflected synthetic light and projecting the resulting light.

SUMMARY OF THE INVENTION

In order to obtain a high intensity and highly efficient projection image with a scanning type projector, a laser beam, the intensity of which is modulated according to a display image, must be emitted without a loss inside the scanning type projector. For this reason, an improvement in the reflectance of a scanning mirror and an improvement in the transmittance and reflectance of a lens and/or a mirror in an optical path are required.

Furthermore, in a scanning type projector, in order to obtain a high quality image, wherein the beam diameter on a plane to be projected corresponds to one pixel, the beam diameter of a laser beam on the plane to be projected needs to be set to a size corresponding to the resolution.

On the other hand, the cross section of a laser beam output from a semiconductor laser serving as a light source is elliptical. For this reason, in order for the laser beam to transmit through an optical component without a loss and have a predetermined size on the plane to be projected, the laser beam is preferably shaped.

JP-A-2010-32797 discloses that the beam diameters of laser light sources, the optical axes of which are to be synthesized, are equalized by two wedge prisms, but addresses neither the efficiency of a laser beam nor the shape of the beam on a plane to be projected at all.

The present invention has been made in view of the above circumstances, and provides a scanning type projector capable of projecting a bright and high-quality image with a simple configuration.

In order to solve the above-described problem, a scanning type projector two-dimensionally projecting a laser beam and generating an image according to the present invention comprises: a light source having a light intensity corresponding to a pixel of the image and emitting a laser beam having an elliptical beam; a collimator lens collimating the laser beam emitted from the light source without converting the same into focused light; a beam contracting/shaping element that reduces a luminous beam width in a predetermined direction of the laser beam emitted from the collimator lens; a condensing lens that converts a laser beam emitted from the beam contracting/shaping element into focused light corresponding to a projection distance; and a two-dimensional scanning unit configured to two-dimensionally scan and project a laser beam emitted from the condensing lens. Here, an elliptic major axis direction of the laser beam having an elliptical beam emitted from the light source is caused to be coincident with a luminous beam contracting direction of the beam contracting/shaping element.

According to the present invention, by shaping an elliptical laser beam emitted from a light source in accordance with the shape of a beam scanning unit, a loss of the laser beam can be reduced and the beam diameter of a laser beam on a plane to be projected can be adjusted in accordance with the resolution and therefore a high intensity and highly efficient projection image can be obtained.

DETAILED DESCRIPTION OF THE EMBODIMENTS

Hereinafter, embodiments of the present invention are described in detail using the accompanying drawings.

Embodiment 1

Figure 1:
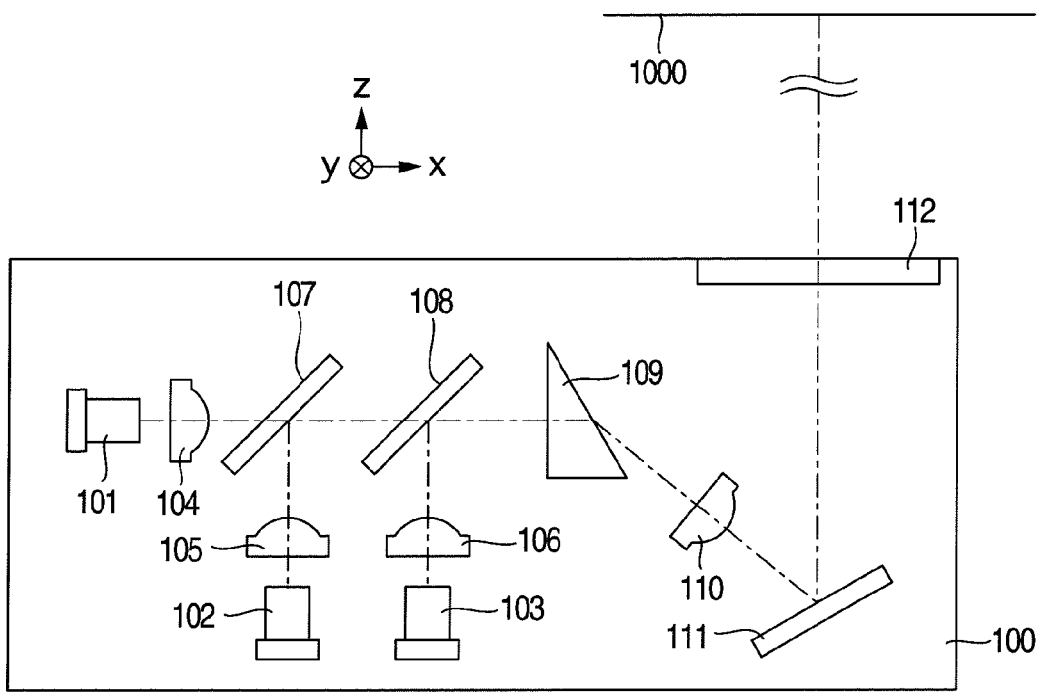
FIG. 1 is a configuration diagram of a scanning type projector of an embodiment.

FIG. 1 is a view showing the configuration of a scanning type projector 100 of Embodiment 1. The scanning type projector 100 emits a laser beam, which is modulated according to a display image, and forms a projected image in a plane to be projected 1000. In the view, a dashed-dotted line indicates the optical axis of the laser beam. In FIG. 1, the plane direction of the plane to be projected 1000 is of an x-y axial plane, and the direction perpendicular to the plane to be projected 1000 is a z-axis direction.

The scanning type projector 100 of the embodiment comprises: laser light sources 101, 102, and 103; collimator lens 104, 105, and 106; mirrors 107 and 108; a beam contracting/shaping prism 109; a condensing lens 110; a scanning element 111; and a transparent cover 112.

The laser light sources 101, 102, and 103 are semiconductor lasers that output light of a wavelength of the green color, light of a wavelength of the blue color, light of a wavelength of the red color as divergent light, respectively. The collimator lens 104, 105, and 106 convert the emitted light of the laser light sources 101, 102, and 103 into parallel light, respectively. The mirrors 107 and 108 are wavelength selective mirrors transmitting therethrough or reflecting light of a specified wavelength, and synthesize the beams of the semiconductor lasers.

The mirror 107 is a wavelength selective mirror transmitting therethrough light of the wavelength of the green color and reflecting light of the wavelength of the red color. In the mirror 107, a laser beam of the wavelength of the green color output from the laser light source 101 and converted into parallel light by the collimator lens 104 transmits therethrough, while a laser beam of the wavelength of the red color output from the laser light source 102 and converted into parallel light by the collimator lens 105 is reflected. Thereby, a synthetic light of the laser beam of the wavelength of the green color and the laser beam of the wavelength of the red color is obtained.

The mirror 108 is a wavelength selective mirror having a function to transmit therethrough light of the wavelength of the red color and light of the wavelength of the green color and reflect light of the wavelength of the blue color. In the mirror 108, a synthetic light of the laser beam of the wavelength of the green color and the laser beam of the wavelength of the red color from the mirror 107 transmits therethrough, while a laser beam of the wavelength of the blue color output from the laser light source 103 and converted into parallel light by the collimator lens 106 is reflected. Thereby, a synthetic light of the laser beam of the wavelength of the green color, the laser beam of the wavelength of the red color, and the laser beam of the wavelength of the blue color is obtained.

Next, the laser beam is incident upon the beam contracting/shaping prism 109. The beam contracting/shaping prism 109 is perpendicular to the y-direction in the view, and is inclined with respect to the x-z plane in the view. The beam contracting/shaping prism 109 reduces and shapes the beam cross section of the laser beam by means of this shape, the detail of which is described later. The laser beam shaped by the beam contracting/shaping prism 109 is incident upon the condensing lens 110.

The condensing lens 110 has a function to convert a laser beam into weakly focused light so that the beam diameter has the optimum size suitable for a predetermined resolution in the plane to be projected 1000 installed outside the scanning type projector 100. The detail of this is also described later. The laser beam transmitting through the condensing lens 110 is incident upon the scanning element 111.

The scanning element 111 has a reflective surface for a laser beam, and is supported by two shafts so that the reflective surface is inclined in two directions. With these support shafts used as a horizontal scanning axis and as a vertical scanning axis, the laser beam is two-dimensionally scanned on the plane to be projected 1000 by driving the mirror surface about each scanning axis to deflect. The scanning element 111 can be realized using, for example, a Micro Electro Mechanical Systems (hereinafter, MEMS) mirror, a galvanometer mirror, or the like.

At an output portion of the laser beam two-dimensionally scanned by the scanning element 111, the transparent cover 112 is provided. The transparent cover 112 comprises a transparent glass or plastic whose transmittance is sufficiently high at the wavelengths of three colors, and is capable of preventing the deterioration of transmittance of an optical component, a failure of the scanning element 111, and the like due to dusts or the like entering into the scanning type projector 100.

Next, the installation of the laser light sources 101, 102, and 103 is described. Usually, the cross section of a laser beam emitted from a semiconductor laser is elliptic. Accordingly, the cross-sectional shape of a laser beam emitted from the laser light sources 101, 102, and 103 is also elliptic. For this reason, a beam shaping direction of the beam contracting/shaping prism 109 and a longitudinal direction of the elliptical shape of the beam of each of the laser light sources 101, 102, and 103 are associated with each other. As the detail is described later, the laser light sources 101, 102, and 103 are rotated and installed so that the longitudinal direction of the beam cross section thereof becomes parallel to the z-direction in the view.

Moreover, it is known that the refractive index of a prism usually differs with wavelength. Also in the beam contracting/shaping prism 109 of this embodiment, the refractive index differs between the laser beam of the wavelength of the green color, the laser beam of the wavelength of the red color, and the laser beam of the wavelength of the blue color, and therefore the refraction angles of the laser beams of the three colors transmitting through the beam contracting/shaping prism 109 are not identical. This results in a deviation in the optical axis of the laser beam.

In order to dissolve this deviation in the optical axis, each of the laser light sources 101, 102, and 103 is installed so as to be able to be moved and adjusted in a plane with respect to the collimator lenses 104, 105, and 106. With this adjustment mechanism, the angle of the optical axis of each laser beam incident upon the beam contracting/shaping prism 109 is changed to a predetermined angle, so that the optical axes of the laser beams of the three colors after emitting from the beam contracting/shaping prism 109 are adjusted to be substantially identical.

Figure 2:
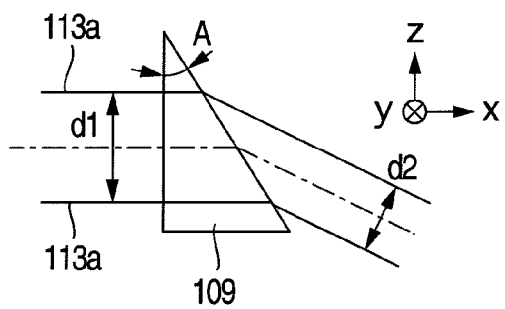
FIG. 2 is a view illustrating a function of a beam contracting/shaping prism.

Now, the detail of the beam contracting/shaping prism 109 is described using FIG. 2. For simplicity, only the beam contracting/shaping prism 109 among the components of the scanning type projector 100 is shown and the other components are omitted.

Usually, the cross section of a laser beam emitted from a semiconductor laser has a Gaussian distribution. The intensity distribution in the cross sections of the laser beam emitted from each of the laser light sources 101, 102, and 103 of the embodiment also has a Gaussian distribution. In the following embodiments, a circle diameter at which the intensity becomes $1/e^2$ (13.5%) times the maximum intensity in the cross section of a laser beam is defined as the beam diameter.

In FIG. 2, a dashed-dotted line indicates the optical axis of the laser beam, and a straight line 113a indicates an optical path of a light beam having the intensity of $1/e^2$ (13.5%) times the maximum intensity in the beam cross section. That is, the length between two straight lines 113a sandwiching the optical axis is the beam diameter. The beam diameter prior to being incident upon the beam contracting/shaping prism 109 is referred to as a beam diameter d1 and the beam diameter after being emitted therefrom is referred to as a beam diameter d2.

The beam contracting/shaping prism 109 is a prism having an incident surface and an emitting surface in the y-axis direction, as shown in FIG. 2. As shown in the view, the vertex angle of the beam contracting/shaping prism 109 is referred to as a vertex angle A. If a laser beam is incident upon and emitted from two surfaces sandwiching the vertex angle A, the laser beam is refracted and reduced in the x-z plane. Because the laser beam is not refracted in the y-axis direction, the laser beam incident upon the beam contracting/shaping prism 109 will have a reduced beam diameter in one direction.

The beam contracting function of such a prism is known as that of an anamorphic prism. If the vertex angle A is varied, the refraction angle of a laser beam will also vary, and therefore by setting the vertex angle A to a predetermined value, a beam shaping ratio that is a ratio of the beam diameter d1 and the beam diameter d2 can be also designed to a predetermined value.

In this embodiment, the beam contracting/shaping prism 109 and the laser light sources 101, 102, and 103 are installed so that the longitudinal direction of the elliptical shape of the beam of each of the laser light sources 101, 102, and 103 becomes the z-axis direction. Thus, the longitudinal axis of the elliptical-shaped laser beam is reduced and shaped by the beam contracting/shaping prism 109, and the resulting laser beam is emitted from the beam contracting/shaping prism 109.

Figure 3:
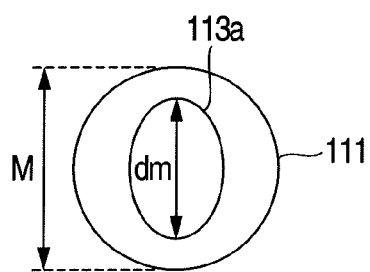
FIG. 3 is a schematic diagram showing the beam diameter of a laser beam on a scanning element.
Figure 4:
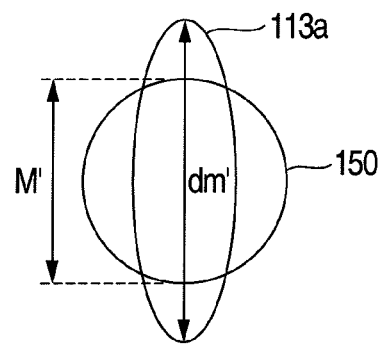
FIG. 4 is a schematic diagram showing the beam diameter of a laser beam on a scanning element in a conventional scanning type projector.

Next, using FIG. 3 and FIG. 4, a relationship between the scanning element 111, such as a MEMS mirror, and the beam diameter of a laser beam is described. FIG. 4 shows a scanning element 150 and a laser beam 113a in a conventional scanning type projector. The beam diameter in the longitudinal direction of the cross-sectional shape of the laser beam is designated by dm' and the diameter of the scanning element 150 parallel to the longitudinal direction is designated by M'.

As described above, the laser beam emitted from a semiconductor laser is elliptic so the cross-sectional shape of the laser beam in the scanning element 150 becomes an elliptic shape of a high ellipticity, as shown in the view. The laser beam outside the diameter M' of the scanning element 150 is not reflected by the scanning elements 150, but is lost. For this reason, the utilization efficiency of the laser beam to project decreases and the brightness of an image decreases.

FIG. 3 illustrates a relationship between the scanning element 111, such as a MEMS mirror, and the beam diameter of a laser beam in the case where the laser beam is emitted onto the scanning element 111 after being shaped by the previously-described beam contracting/shaping prism 109.

Here, usually, the size of a scanning element and the scanning speed are in a trade-off relationship. If a high scanning-speed scanning element is selected for the purpose of high quality images, the size of the scanning element will decrease. For this reason, a reflectance loss of a laser beam may occur in the scanning element, as shown in FIG. 4.

In order to project a bright image, it is indispensable that a laser beam is reflected by the scanning element without energy loss. In order to project a bright image at a high scanning speed, it is important that a laser beam is efficiently reflected by a scanning element with a small size.

Returning to FIG. 3, the beam diameter of a laser beam on the scanning element 111 of the embodiment is described. The scanning element 111 of FIG. 3 is substantially circular, but not limited thereto, and may be, for example, square or the like. The beam diameter in the longitudinal direction of the cross-sectional shape of the laser beam 113a is designated by dm and the diameter of the scanning element 111 parallel to the longitudinal direction is designated by M.

As apparent from FIG. 3, in this embodiment, the vertex angle A of the beam contracting/shaping prism is determined so that the beam diameter dm becomes smaller than the diameter M of the scanning element 111. Therefore, the scanning element 111 can reflect the energy of the laser beam with almost no loss.

In this manner, in this embodiment, by setting the vertex angle A of the beam contracting/shaping prism 109 to a predetermined angle, the laser beam is shaped into a size corresponding to the size of the scanning element 111. Therefore, a laser beam can be efficiently reflected by the scanning element 11 and a bright image can be projected.

Figure 5:
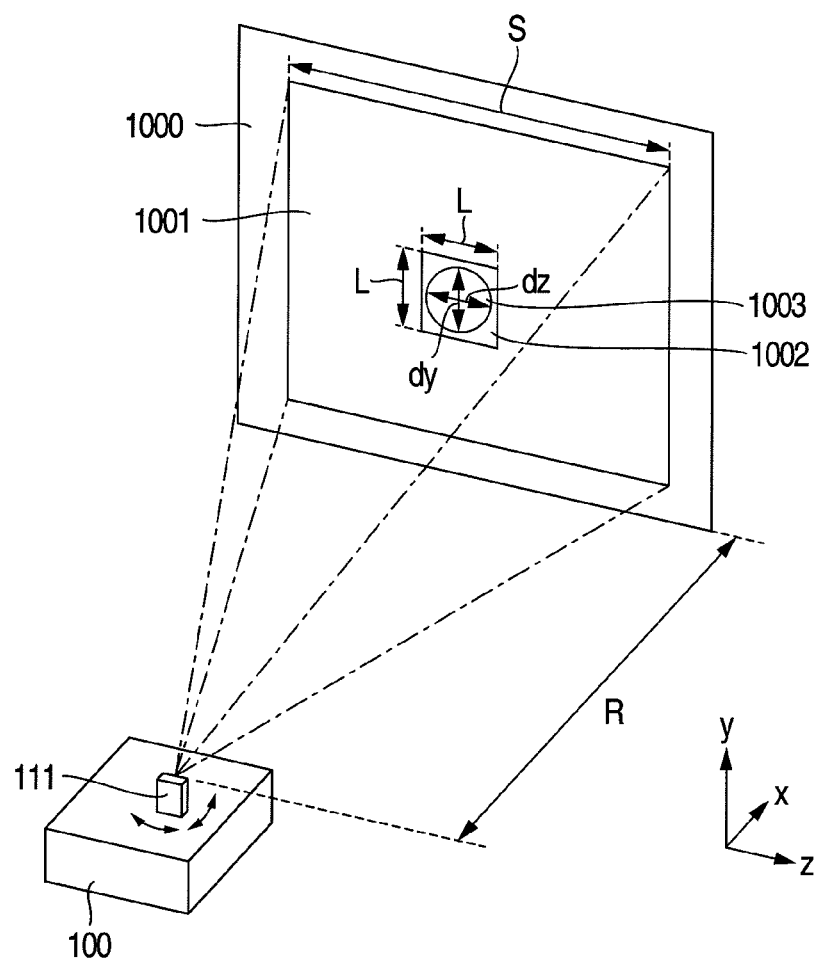
FIG. 5 is a schematic diagram when a scanning type projector is projecting an image on a plane to be projected.
Figure 6:
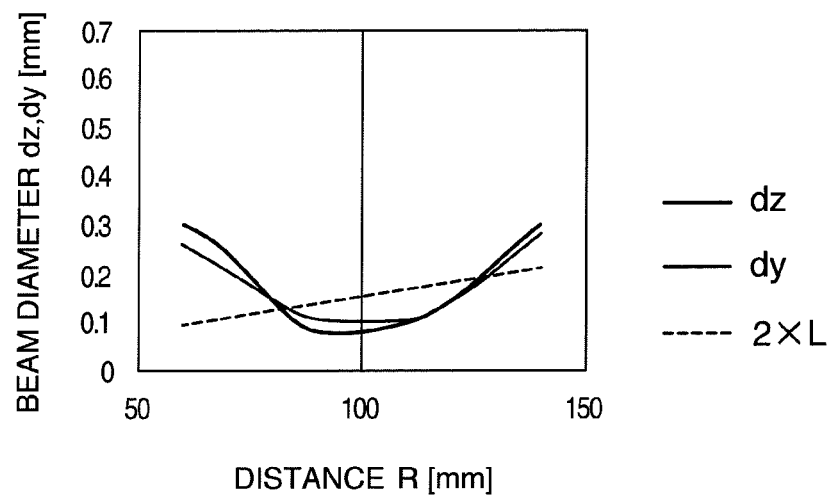
FIG. 6 is a view showing a relationship between diameters dy and dz of an emitted beam of Embodiment 1 and a width L of an ideal pixel.
Figure 7:
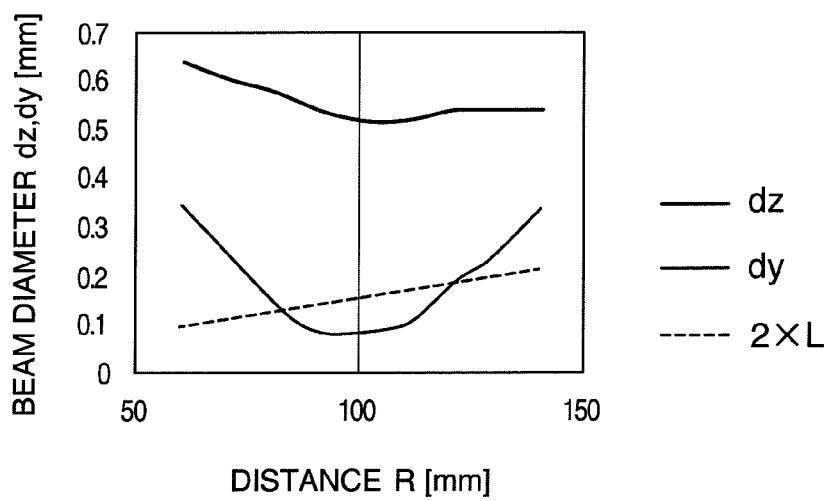
FIG. 7 is a view showing a relationship between the diameters dz and dy of an emitted laser beam of a conventional scanning type projector and the width L of an ideal pixel.

Next, using FIG. 5 to FIG. 7, the function of the condensing lens 110 is described. FIG. 5 is a schematic diagram representing a state where the scanning type projector 100 is projecting an image 101 onto a plane to be projected 1000. For simplicity, components other than the scanning element 111 among the components of the scanning type projector 100 are omitted. Here, a distance between the scanning element 111 and the plane to be projected 1000 is designated by R. The projection image 1001 is a rectangular image short in the y-direction in the view and long in the z-direction in the view, for example. The width in the z-direction of the projection image 1001 is designated by S.

FIGS. 5-7 use a different coordinate system from FIGS. 1, 2 and 8-12.

A square in the projection image 1001 in the view is an ideal pixel 1002 calculated by dividing the width S by a predetermined number of pixels. The width in the z-direction of the ideal pixel 1002 is designated by L. For example, if the shape of the ideal pixel 1002 is square, the resolutions in the z-direction and y-direction of an image to project becomes equal. When the ideal pixel 1002 is square, the width in the y-direction also becomes the same as the width L in the z-direction.

A circle in the ideal pixel 1002 in the view is a cross section 1003 of a laser beam emitted from the scanning type projector 100. In the cross section 1003 of the laser beam, the beam diameter in the y-direction is designated by dy and the beam diameter in the z-direction is designated by dz.

Next, a relationship between the width L of the ideal pixel 1002 and the beam diameters dy and dz of the optical spot 1003 is described. As described above, the cross section 1003 of the laser beam corresponds to one pixel of the projection image 1001. Therefore, if the beam diameters dy and dz are too large as compared with the width L of the ideal pixel 1002, the resolution will degrade.

Here, Modulation Transfer Function (hereinafter, MTF) is described. MTF is a response function of a spatial frequency that is the number of lines per unit space, and is usually used for evaluation of the resolution. If MTF becomes 0%, a striped pattern cannot be recognized. In this embodiment, the beam diameters dy and dz each having a predetermined focal distance are set so as to be equal to or less than twice the width L. Here, in displaying a line for each dot, MTF becomes equal to or greater than 30% and a good resolution can be obtained.

FIG. 6 is a graph showing a relationship between the beam diameters dy and dz and the width L of the ideal pixel 1002 in the configuration having the condensing lens 110 of the embodiment, with the distance R between the scanning element 111 and the plane to be projected 1000 as a parameter. Note that a dotted line in the view is plotted with the value of twice the width L. Here, the distance R between the scanning element 111 and the plane to be projected 1000 is assumed to be approximately 100 mm. This value is set assuming applications in amusement devices, for example, but may be set in accordance with an application of the scanning type projector.

The projection image 1001 projected by the scanning type projector 100 increases as the distance R increases. Therefore, the width L of the ideal pixel 1002 will also increase in proportion to the distance R. The condensing lens 110 has a function to convert a laser beam into weakly focused light so as to set the beam diameter smaller than twice the width L of the ideal pixel 1002 at a predetermined position of the plane to be projected 1000. Here, the focal distance of the condensing lens 110 is set to, for example, approximately 100 mm that is equal to the distance R. As shown in the view, the beam diameters dz, dy at the distance R are equal to or less than twice the width L of the ideal pixel 1002, and thus an image with a good resolution can be projected in the plane to be projected 1000.

FIG. 7 is a graph showing a relationship between the beam diameters dz, dy of a laser beam emitted from a conventional scanning type projector without the beam contracting/shaping prism 109 and condensing lens 110 of the embodiment, and the width L of the ideal pixel 1002. As with FIG. 6, the distance R between the scanning element 111 and the plane to be projected 1000 is used as the parameter. Furthermore, a dotted line in the view is plotted with the value of twice the width L.

In the conventional scanning type projector, in order to obtain a good projection image at the predetermined projection distance R, a laser beam is converted into weakly focused light by the collimator lenses 104, 105, and 106. Thus, the beam diameter dz of FIG. 7 has the same value as FIG. 6, but since the laser beam emitted from a semiconductor laser is elliptic as described above, the beam diameter dy increases. Moreover, as described above, an optical loss in the scanning element 111 may occur.

As described above, with the beam contracting/shaping prism 109 of the embodiment, an influence due to the fact that the laser beam emitted from a semiconductor laser is elliptic can be corrected. However, only addition of the beam contracting/shaping prism 109 of the embodiment to the conventional scanning type projector will cause the following problem.

In the conventional scanning type projector, as described above, a laser beam is converted into weakly focused light by the collimator lenses 104, 105, and 106. For this reason, in the case where the beam contracting/shaping prism 109 is simply added in an optical path, a weakly-focused laser beam will be incident upon the beam contracting/shaping prism 109.

As described above, the beam contracting/shaping prism 109 has a function to shape a laser beam by contracting one side of the beam cross section. However, it also has a function to reduce the curvature of a wave front of a laser beam at the same time. Because a curvature of the wave front of a laser beam in the x-z plane direction to be reduced and a curvature of the wave front of a laser beam in the y-direction not to be reduced vary, a convergent beam point in the x-z plane direction and a convergent beam point in the y-direction are located at different positions, respectively. Usually, this phenomenon is referred to as astigmatic aberration.

If astigmatic aberration is given to a laser beam, then in a vicinity of 100 mm of the distance R, at which the plane to be projected 1000 is assumed to be disposed, the beam diameter dz can be reduced down to the width L or less, but the beam diameter dy becomes extremely large as compared with the width L, as shown in the view. Therefore, the resolution degrades.

In this manner, a simple addition of the beam contracting/shaping prism 109 of the embodiment to a conventional scanning type projector cannot give the effect of the beam contracting/shaping prism 109 in the plane to be projected 1000.

In the scanning type projector 100 of the embodiment, the collimator lens 104, 105, and 106 each convert a laser beam into parallel light instead of converting the same into weakly focused light, and thus the curvature of the light beam incident upon the beam contracting/shaping prism 109 is set to zero. For this reason, even if a laser beam transmits through the beam contracting/shaping prism 109, the curvature of the wave front thereof will not vary and thus the astigmatic aberration is not given. Furthermore, by converting the laser beam into weakly focused light by the condensing lens 110, both the beam diameters dy and dz can be reduced down to twice the width L of the ideal pixel 1002 or less in the plane to be projected 1000.

As described above, in this embodiment, a laser beam is shaped by the beam contracting/shaping prism 109 so that the beam diameter becomes smaller than the size of the scanning element 111, whereby all the energy of the laser beam can be reflected without any loss and a bright image can be obtained. In addition, the beam diameter on the plane to be projected 1000 is reduced to a predetermined size or less by the condensing lens 110, whereby a high resolution can be obtained.

Note that, this embodiment assumes that the distance R between the scanning element 111 and the plane to be projected 1000 is approximately 100 mm, but not limited thereto, and the condensing lens 110 with a predetermined focal distance may be used so that the beam diameter becomes a predetermined one at the predetermined distance R.

The scanning type projector 100 of this embodiment may comprise at least the laser light sources 101, 102, and 103, the collimator lenses 104, 105, and 106, the mirrors 107 and 108, the condensing lens 110, and the scanning element 111 as described above, and thus may include additional optical elements, such as a diffraction grating and a wavelength plate, therebetween or may include an optical path bent by a mirror. Hereinafter, embodiments of other configurations are described.

Embodiment 2

Figure 8:
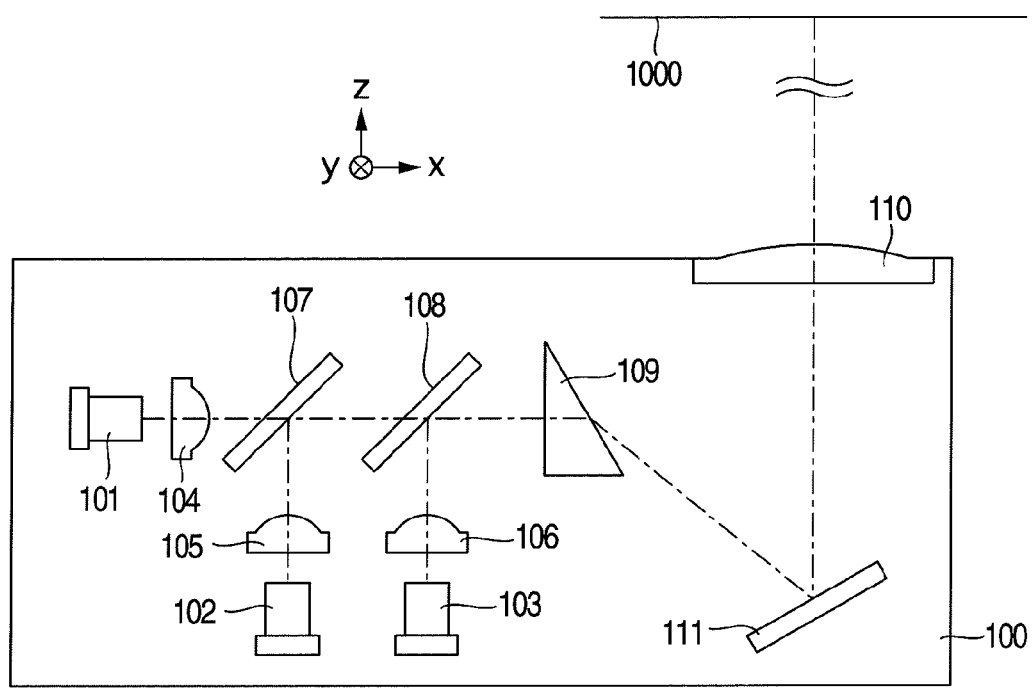
FIG. 8 is an explanatory view of a scanning type projector of another embodiment.

In the scanning type projector 100 of the present invention, the beam diameter of the laser beam may be set smaller than the size of the scanning element 111 by the laser beam being shaped by the beam contracting/shaping prism 109, and the beam diameter on the plane to be projected 1000 may be set equal to or less than a predetermined size by the condensing lens 110. Accordingly, the condensing lens 110 may be disposed on the output side of the laser beam of the beam contracting/shaping prism 109, and thus even if the arrangement sequence of the condensing lens 110 and the scanning element 111 is changed, there is no problem. In FIG. 8, the condensing lens 110 is disposed instead of the transparent cover 112 of FIG. 1.

Embodiment 3

In a scanning type projector, the laser beams of red and green colors significantly affect the image quality. Using this characteristic, as shown in FIG. 9, between the mirror 107, through which a laser beam of the wavelength of the green color output from the laser light source 101 and converted into parallel light by the collimator lens 104 transmits and by which a laser beam of the wavelength of the red color output from the laser light source 102 and converted into parallel light by the collimator lens 105 is reflected, the mirror 107 emitting a synthetic light of the laser beam of the wavelength of the green color and the laser beam of the wavelength of the red color, and the mirror 108, through which the synthetic light of the laser beam of the wavelength of the green color and the laser beam of the wavelength of the red color from the mirror 107 transmits and by which the laser beam of the wavelength of the blue color output from the laser light source 103 and converted into parallel light by the collimator lens 106 is reflected, the mirror 108 obtaining a synthetic light of the laser beam of the wavelength of the green color, the laser beam of the wavelength of the red color, and the laser beam of the wavelength of the blue color, the beam contracting/shaping prism 109 may be disposed.

Figure 9:
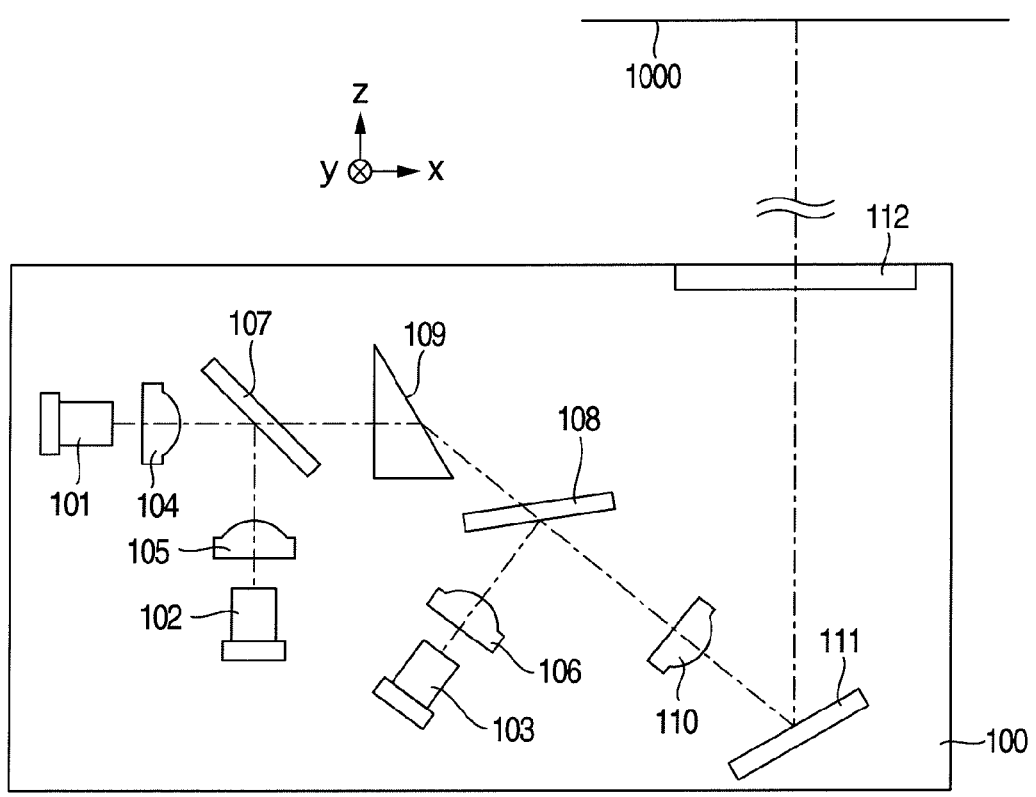
FIG. 9 is an explanatory view of a scanning type projector of another embodiment.

In the configuration of FIG. 9, although the laser beam of the blue color is not shaped, there is no significant influence on the image quality because the sensibility to the blue color is low. In the configuration of FIG. 9, because a deviation in the optical axis of the laser beam of the blue color due to the beam contracting/shaping prism does not occur, the positioning adjustment of the blue laser is not required.

Embodiment 4

Figure 10:
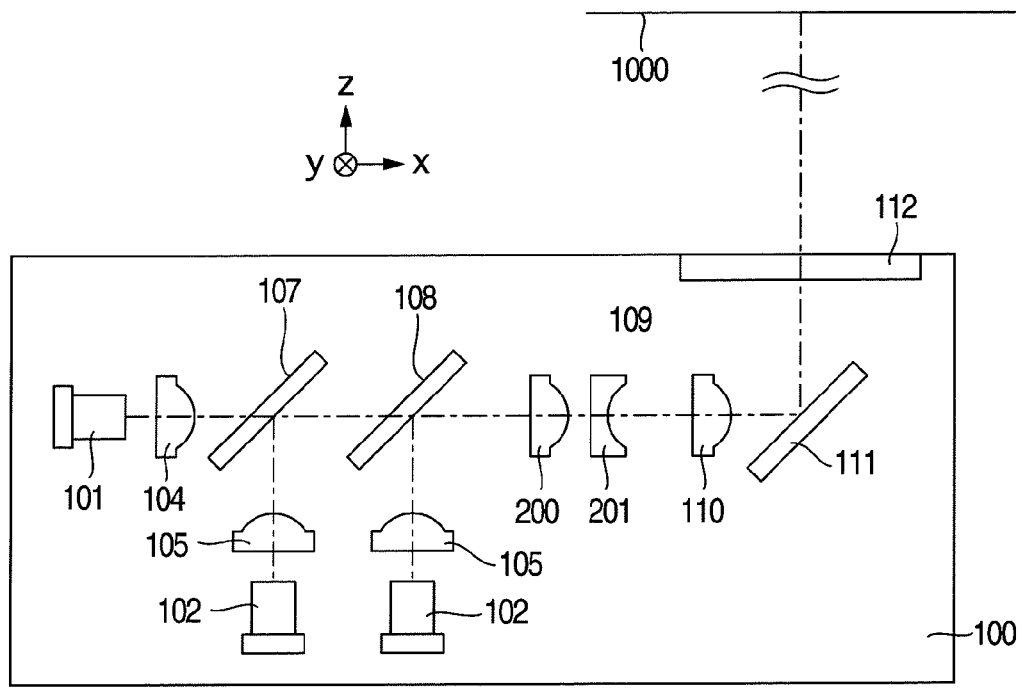
FIG. 10 is an explanatory view of a scanning type projector of another embodiment.

In the above-described embodiments, an example has been described, in which the cross-sectional shape of a laser beam is shaped by the beam contracting/shaping prism 109, but the beam shaping can be also performed by other than the prism. For example, as shown in FIG. 10, in place of the beam contracting/shaping prism 109, a convex cylindrical lens 200 and a concave cylindrical lens 201 may be employed.

Embodiment 5

Figure 11:
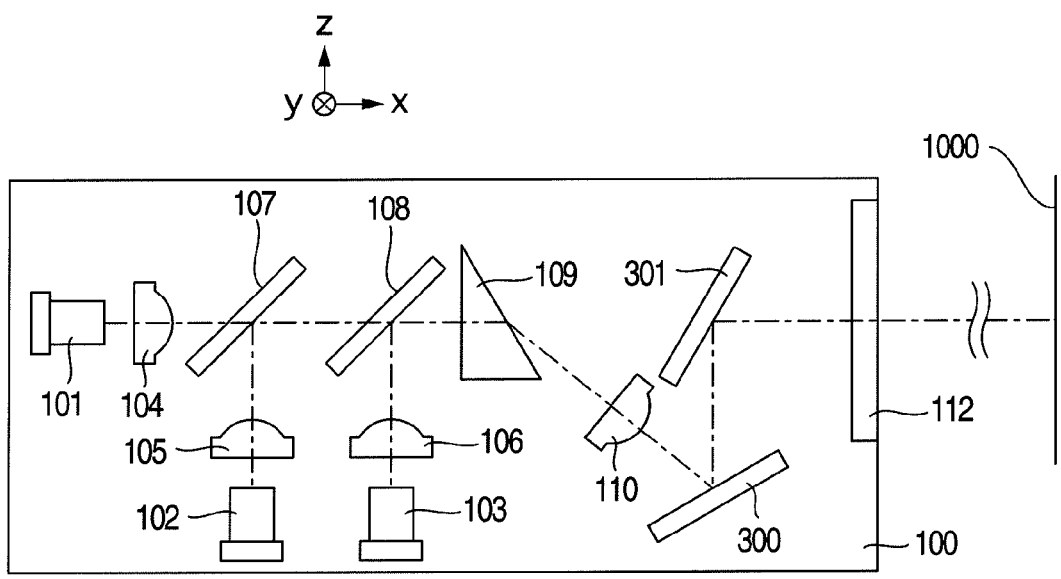
FIG. 11 is an explanatory view of a scanning type projector of another embodiment.
Figure 12:
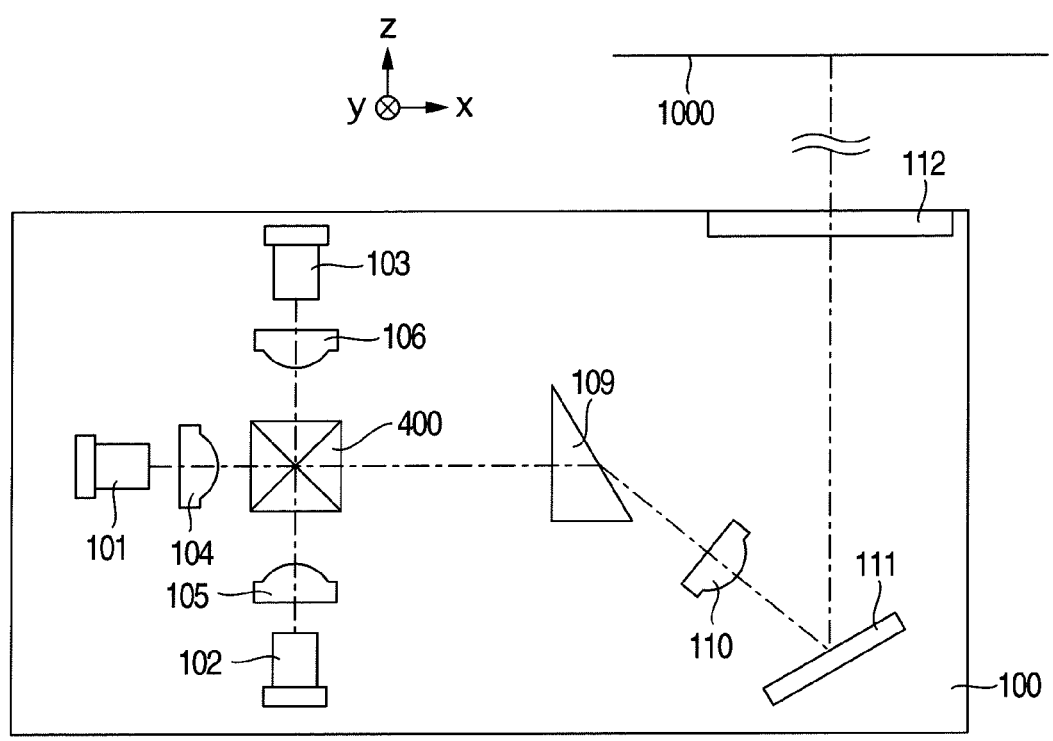
FIG. 12 is an explanatory view of a scanning type projector of another embodiment.

In the above-described embodiments, an example has been described, in which the scanning element 111 two-dimensionally scans a laser beam onto the plane to be projected 1000, but as shown in FIG. 11, a deflection mirror 300 with a horizontal scanning axis and a deflection mirror 301 with a vertical scanning axis may be employed, and with these two mirrors, the plane to be projected 1000 may be two-dimensionally scanned. Moreover, the scanning element may two-dimensionally scan a laser beam onto the plane to be projected 1000, and thus even if the deflection mirrors 300 and 301 are reversed, there is no problem.

Embodiment 6

The synthesis sequence of the laser light sources 101, 102, and 103 is not limited to the sequences of FIG. 1, FIG. 8, FIG. 10, and FIG. 11, but even if the arrangement sequence of the laser light sources 101, 102, and 103 is changed, there is no problem. Moreover, in place of the mirrors 107 and 108, a cross prism 400 shown in FIG. 12 may be employed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A scanning type projector two-dimensionally projecting a laser beam and generating an image, comprising:
    a light source having a light intensity corresponding to a pixel of the image and emitting a laser beam having an elliptical beam;
    a collimator lens collimating a laser beam emitted from the light source;
    a beam contracting/shaping element that reduces a luminous beam width in a predetermined direction of the laser beam emitted from the collimator lens;
    a condensing lens that converts the laser beam emitted from the beam contracting/shaping element into focused light corresponding to a projection distance; and
    a two-dimensional scanning unit configured to two-dimensionally scan and project the laser beam emitted from the condensing lens;
    wherein an elliptic major axis direction of the laser beam having an elliptical beam emitted from the light source and a luminous beam contracting direction of the beam contracting/shaping element are coincident with each other, and
    wherein
    the beam contracting/shaping element comprises a convex cylindrical lens and a concave cylindrical lens.

2. A scanning type projector two-dimensionally projecting a laser beam and generating an image, comprising:
    a light source having a light intensity corresponding to a pixel of the image and emitting a laser beam having an elliptical beam;
    a collimator lens collimating a laser beam emitted from the light source;
    a beam contracting/shaping element that reduces a luminous beam width in a predetermined direction of the laser beam emitted from the collimator lens;
    a condensing lens that converts the laser beam emitted from the beam contracting/shaping element into focused light corresponding to a projection distance; and
    a two-dimensional scanning unit configured to two-dimensionally scan and project the laser beam emitted from the condensing lens;
    wherein
    the light source and the collimator lens are independently provided for each of red color, green color, and blue color,
    the scanning type projector further comprising a beam synthesis unit configured to synthesize a red laser beam, a green laser beam, and a blue laser beam, wherein
    for each of the red color, green color, and blue color, a laser beam of the light source is collimated by the collimator lens, wherein
    the collimated red laser beam, green laser beam, and blue laser beam are synthesized by the beam synthesis unit, wherein
    a light beam synthesized by the beam synthesis unit is incident upon the beam contracting/shaping element, and is reduced in size, wherein
    a transmitting beam of the beam contracting/shaping element is incident upon the condensing lens, and is converted into focused light, and wherein
    a laser beam transmitted from the condensing lens is transmitted to the two-dimensional scanning unit.

3. The scanning type projector according to claim 2, wherein
    the light source for each of the red color, green color, and blue color is installed in a state where an elliptic major axis direction of a laser beam having an elliptical beam emitted is aligned with each other, and wherein the laser beam is collimated by the collimator lens and is incident upon the beam synthesis unit.

4. The scanning type projector according to claim 3, wherein an elliptic major axis direction of the laser beam synthesized by the beam synthesis unit and a direction, along which a luminous beam width is reduced by the beam contracting/shaping element, are coincident with each other.

5. The scanning type projector according to claim 4, wherein the beam contracting/shaping element is a prism that receives and transmits a laser beam through two surfaces thereof sandwiching a vertex angle A corresponding to a reduced width, the scanning type projector including, for each of the red color, green color, and blue color, an adjustment mechanism that moves in parallel, an optical axis, along which the light source emits a laser beam having an elliptical beam, and an optical axis of the collimator lens according to a wavelength of the light source.

6. A scanning type projector scanning a laser beam on a plane to be projected and projecting a two-dimensional image, comprising:

a light source emitting the laser beam;

a scanning element scanning the laser beam; and an optical element group, wherein the optical element group shapes a laser beam so as to satisfy $dm<M$ and $d<2L$, where a diameter of the scanning element is designated by M, a length obtained by dividing a width of the two-dimensional image by a number of pixels is designated by L, a diameter, at which an intensity becomes $1/e^2$ times a maximum intensity, in a cross section of the laser beam, is defined as a beam diameter, the beam diameter on the scanning element is designated by dm, and the beam diameter on the plane to be projected is designated by d.

7. A scanning type projector scanning a laser beam on a plane to be projected and projecting a two-dimensional image, comprising:

a light source emitting the laser beam;

a scanning element scanning the laser beam; and an optical element group, wherein the optical element group comprises a collimator lens converting the laser beam into substantially parallel light, a beam contracting/shaping element shaping the laser beam, and a condensing lens converting the laser beam into a weakly-focused light beam, wherein the optical element group satisfies $dm<M$ and $d<2L$, where a diameter of the scanning element is designated by M, a length obtained by dividing a width of the two-dimensional image by a number of pixels is designated by L, a diameter, at which an intensity becomes $1/e^2$ times a maximum intensity, in a cross section of the laser beam, is defined as a beam diameter, the beam diameter on the scanning elements is designated by dm, and the beam diameter on the plane to be projected is designated by d.

8. The scanning type projector according to claim 7, wherein the beam contracting/shaping element shapes a beam so as to satisfy $dm<M$, and wherein the condensing lens converts the laser beam into a weakly-focused light beam so as to satisfy $d<2L$.

9. The scanning type projector according to claim 7, wherein a luminous beam cross section of a light beam prior to transmitting through the light beam contracting/shaping element is elliptic, and wherein the light beam contracting/shaping element reduces and shapes the light beam with respect to a longitudinal direction of the beam cross section of the light beam.

10. The scanning type projector according to claim 7, wherein the beam contracting/shaping element comprises at least one trapezoid or wedge-shaped prism.

11. The scanning type projector according to claim 7, wherein the beam contracting/shaping element comprises at least one cylindrical lens.

* * * * *